(12) United States Patent
Sun

(10) Patent No.: US 12,001,630 B2
(45) Date of Patent: Jun. 4, 2024

(54) TOUCH DISPLAY PANEL AND TOUCH DISPLAY APPARATUS

(71) Applicant: Hefei Visionox Technology Co., Ltd., Anhui (CN)

(72) Inventor: Dandan Sun, Hefei (CN)

(73) Assignee: Hefei Visionox Technology Co., Ltd., Hefei (CN)

( * ) Notice: Subject to any disclaimer, the term of this patent is extended or adjusted under 35 U.S.C. 154(b) by 0 days.

(21) Appl. No.: 18/466,144

(22) Filed: Sep. 13, 2023

(65) Prior Publication Data

US 2023/0418408 A1 Dec. 28, 2023

Related U.S. Application Data

(63) Continuation of application No. PCT/CN2022/114444, filed on Aug. 24, 2022.

(30) Foreign Application Priority Data

Dec. 13, 2021 (CN) .......................... 202111518151.2

(51) Int. Cl.
*G06F 3/041* (2006.01)
*G06F 3/044* (2006.01)

(52) U.S. Cl.
CPC ........ *G06F 3/04164* (2019.05); *G06F 3/0446* (2019.05); *G06F 2203/04102* (2013.01); *G06F 2203/04107* (2013.01)

(58) Field of Classification Search
CPC ............... G06F 3/04164; G06F 3/0446; G06F 2203/04102; G06F 2203/04107;
(Continued)

(56) References Cited

U.S. PATENT DOCUMENTS 11,061,266 B2* 7/2021 Wang ..................... G06F 3/0446
2010/0110038 A1* 5/2010 Mo ........................ G06F 3/0445
345/174
(Continued)

FOREIGN PATENT DOCUMENTS

CN 108155211 A 6/2018
CN 108958542 A 12/2018
(Continued)

OTHER PUBLICATIONS

International Search Report issued on Nov. 22, 2022 in corresponding International Application No. PCT/CN2022/114444, 7 pages.
(Continued)

*Primary Examiner* — Ibrahim A Khan
(74) *Attorney, Agent, or Firm* — Maier & Maier, PLLC

(57) ABSTRACT

A touch display panel and a touch display apparatus, including: a substrate; a shielding layer disposed on one side of the substrate and including a plurality of shielding units arranged in array; a touch function layer disposed on a side of the shielding layer facing away from the substrate and including a plurality of touch electrodes arranged in array; and a plurality of electrode wires in one-to-one correspondence to and electrically connected to the plurality of touch electrodes. The plurality of electrode wires include at least one first-type electrode wire including a first lead wire and a second lead wire electrically connected to the first lead wire. The first lead wire is in the same layer as the touch function layer. The second lead wire is in the same layer as the shielding layer and spaced apart and insulated from the shielding units.

18 Claims, 5 Drawing Sheets

(58) Field of Classification Search
CPC ......... G06F 2203/04103; G06F 3/0412; G06F 3/0443; G06F 3/0445; G06F 2203/04112
See application file for complete search history.

(56) References Cited

U.S. PATENT DOCUMENTS

| | | | |
|---|---|---|---|
| 2012/0056841 A1* | 3/2012 | Krenik | G06F 3/04182 345/174 |
| 2012/0187821 A1* | 7/2012 | Lee | H05K 9/0064 174/250 |
| 2013/0335355 A1* | 12/2013 | Ding | G06F 3/0416 200/305 |
| 2017/0045984 A1* | 2/2017 | Lu | H01L 27/1222 |
| 2017/0123540 A1* | 5/2017 | Shih | G06F 3/0447 |
| 2017/0308221 A1 | 10/2017 | Li et al. | |
| 2018/0025203 A1* | 1/2018 | Lee | G06V 40/13 382/124 |
| 2018/0059843 A1* | 3/2018 | Kim | H10K 59/40 |
| 2018/0088717 A1* | 3/2018 | Chen | G06F 3/0446 |
| 2018/0373079 A1* | 12/2018 | Yeh | G02F 1/133345 |
| 2019/0243485 A1* | 8/2019 | Choi | G06F 3/0416 |
| 2020/0081565 A1* | 3/2020 | Zhang | G06F 3/0412 |
| 2020/0089373 A1* | 3/2020 | Liu | G06F 3/044 |
| 2020/0185416 A1* | 6/2020 | Wu | H01L 29/78648 |
| 2021/0004123 A1* | 1/2021 | Tan | H01L 27/1222 |
| 2023/0276665 A1* | 8/2023 | Na | H10K 59/126 345/174 |

FOREIGN PATENT DOCUMENTS

| | | |
|---|---|---|
| CN | 111880679 A | 11/2020 |
| CN | 112269494 A | 1/2021 |
| CN | 112711349 A | 4/2021 |
| CN | 112947794 A | 6/2021 |
| CN | 113050840 A | 6/2021 |
| CN | 113076030 A | 7/2021 |
| CN | 113325971 A | 8/2021 |
| CN | 113434054 A | 9/2021 |
| CN | 214586837 U | 11/2021 |
| CN | 114253420 A | 3/2022 |
| WO | 2015180421 A1 | 12/2015 |

OTHER PUBLICATIONS

Written Opinion issued on Nov. 22, 2022 in corresponding International Application No. PCT/CN2022/114444, 6 pages.
Notification to Grant Patent Right for Invention issued on Jul. 24, 2023 in corresponding Chinese Application No. 202111518151.2, 6 pages.

* cited by examiner

TOUCH DISPLAY PANEL AND TOUCH DISPLAY APPARATUS

CROSS-REFERENCE TO RELATED APPLICATIONS

This application is a continuation of international patent application No. PCT/CN2022/114444, filed on Aug. 24, 2022, which claims priority to Chinese Patent Application No. 202111518151.2, entitled "TOUCH DISPLAY PANEL AND TOUCH DISPLAY APPARATUS" filed on Dec. 13, 2021. The contents of the above identified applications are hereby incorporated herein in their entireties by reference.

TECHNICAL FIELD

The present application relates to the field of display technologies, and in particular, to a touch display panel and a touch display apparatus.

BACKGROUND

With the development of display technologies, display apparatuses (such as touch displays) with touch functions have been widely used in electronic devices such as mobile phones and computers as a simple, convenient, and natural manner of human-computer interaction.

A touch display panel includes a touch electrode and an electrode wire connected to the touch electrode, and the touch electrode is connected to a touch integrated circuit (IC) via the electrode wire.

However, for a self-capacitance touch display panel, there are many electrode wires connected to touch electrodes, which requires a separate layer for disposing the electrode wires, resulting in a relatively high production cost.

SUMMARY

The present application provides a touch display panel including: a substrate; a shielding layer disposed on one side of the substrate, the shielding layer including a plurality of shielding units arranged in array; a touch function layer disposed on a side of the shielding layer facing away from the substrate, the touch function layer including a plurality of touch electrodes arranged in array; and a plurality of electrode wires in one-to-one correspondence to and electrically connected to the plurality of touch electrodes. The plurality of electrode wires include at least one first-type electrode wire including a first lead wire and a second lead wire electrically connected to the first lead wire. The first lead wire is in the same layer as the touch function layer. The second lead wire is in the same layer as the shielding layer. The second lead wire is spaced apart and insulated from the shielding units.

The above touch display panel includes the substrate, the shielding layer, the touch function layer, and the plurality of electrode wires. The shielding layer disposed on the side of the substrate includes the plurality of shielding units arranged in array, which can shield the display function layer of the touch display panel from the interference of external carriers. The touch function layer disposed on the side of the shielding layer facing away from the substrate includes the plurality of touch electrodes arranged in array, which can detect touch actions at different positions. The plurality of electrode wires are in one-to-one correspondence to and electrically connected to the plurality of touch electrodes. The plurality of electrode wires include at least one first-type electrode wire. The first-type electrode wire includes the first lead wire disposed in the same layer as the touch function layer and the second lead wire electrically connected to the first lead wire and disposed in the same layer as the shielding layer. The second lead wire is spaced apart and insulated from the shielding units. The touch electrodes can be connected to a touch IC via the corresponding electrode wires. By letting the electrode wires (e.g., the first-type electrode wires) disposed in a different layer from the touch electrodes be in the same layer as the shielding layer, and utilizing the spaces between the shielding units to dispose the electrode wires connected to the touch electrodes, a separate layer for disposing the electrode wires connected to the touch electrodes is saved, and the insulating material disposed between the separate layer and the touch electrodes is also saved. Thus, the entire touch function layer only needs to contain one layer of touch electrodes on the display function layer, which greatly reduces procedures of the production process, effectively improves the production efficiency, and reduces the production cost, without affecting the shielding effect of the shielding units on the external carriers.

In an embodiment, the touch display panel further includes an anode layer, a light-emitting layer group, and a cathode layer stacked on a side of the shielding laye facing away from the substrate. The light-emitting layer group includes a plurality of light-emitting units arranged in the same layer and spaced apart from each other. The anode layer includes a plurality of anodes in one-to-one correspondence to and electrically connected to the plurality of light-emitting units. The cathode layer is electrically connected to the light-emitting units. The touch electrodes and the anodes are arranged in the same layer and spaced apart from each other.

In this embodiment, the touch electrodes are further transferred into the same layer as the anode layer, and the touch electrodes are disposed in spaces between anodes in the anode layer, so that a separate layer for disposing the touch electrodes is not required, further reducing the procedures of the production process, improving the production efficiency, and reducing the production cost, without affecting injection of currents from the anodes to the light-emitting units.

In an embodiment, the plurality of electrode wires further include at least one second-type electrode wire including a third lead wire in the same layer as the touch function layer.

As the electrode wires corresponding to the touch electrodes are disposed in the same layer as the touch function layer, the design of wiring is easier.

In an embodiment, the touch electrodes electrically connected to the first-type electrode wires and the touch electrodes electrically connected to the second-type electrode wires are arranged in a staggered manner. In an embodiment, the touch electrodes electrically connected to the first-type electrode wires and the touch electrodes electrically connected to the second-type electrode wires are arranged alternately in a column direction. In this way, the distance between the electrode wires electrically connected to two adjacent touch electrodes is relatively large, reducing the mutual interference between the electrode wires.

In an embodiment, the touch electrodes electrically connected to the first-type electrode wires and the touch electrodes electrically connected to the second-type electrode wires are arranged in a staggered manner both in the column direction and in a row direction. In this way, the distance between the electrode wires electrically connected to two adjacent touch electrodes is largest, minimizing the mutual interference between the electrode wires.

In an embodiment, the touch display panel has a display area and a non-display area at least partially surrounding the display area. The display area is provided with a contact hole extending in a direction perpendicular to the touch display panel. The first lead wire and the second lead wire being electrically connected through the contact hole. The shielding units and the anodes are all in the display area. The electrode wires are led from the anode layer to the shielding layer in the display area. Thus, the electrode wires will not pass through the packaging layer, which is beneficial to prevent intrusion of external water and oxygen into the light-emitting layer group.

In an embodiment, the touch display panel further includes a bank structure arranged on the substrate and located in the non-display area. The second lead wire passes through a side of the bank structure proximal to the substrate.

In this embodiment, by disposing the bank structure in the non-display area, cracks on an edge when the touch display panel is cut can be prevented, and extension of the cracks to the display area can be prevented. The second lead wire is electrically connected to a chip in the bonding area by passing underneath the bank structure without passing over the bank. If the electrode wire passes over the bank, the height of the bank would cause the photoresist for depositing the electrode wire relatively thick, so that the photoresist is prone to insufficient exposure and residues, thereby leading to short circuiting between the electrode wires. If the full exposure of the photoresist is otherwise pursued, the production consumption and the production cost would be increased. In this embodiment, the electrode wires pass underneath the bank structure, which can prevent the problem of short circuiting of the electrode wires caused by photoresist residue or the problem of higher production cost due to overexposure in case of the electrode wires passing over the bank.

In an embodiment, the plurality of electrode wires are all first-type electrode wires. In this case, all the electrode wires pass underneath the bank structure, which can prevent the problem of short circuiting of the electrode wires caused by photoresist residue or the problem of higher production cost due to overexposure in case of the electrode wires passing over the bank.

In an embodiment, the non-display area includes a bending area, and the electrode wires, after passing through the side of the bank structure proximal to the substrate, are transferred from the shielding layer to a wiring layer in the bending area and then transferred back to the shielding layer.

The electrode wires are first transferred to the wiring layer before passing through the bending area, and then transferred back to the shielding layer after passing through the bending area, so as to protect all wires in the bending area.

In an embodiment, the touch display panel further includes a driving circuit layer disposed between the anode layer and the shielding layer.

As the driving circuit layer is disposed between the anode layer and the shielding layer, the electrode wires arranged on the same layer as the anode layer and the electrode wires arranged on the same layer as the shielding layer are far apart, which is beneficial to reduce mutual interference between the electrode wires.

The present application further provides a touch display apparatus including the touch display panel of any one of the above embodiments.

BRIEF DESCRIPTION OF THE DRAWINGS

In order to more clearly illustrate the technical solutions in the embodiments of the present application or the prior art, the accompanying drawings to be used in the description of the embodiments or the prior art will be briefly introduced below. It is apparent that, the accompanying drawings in the following description are only some embodiments of the present application, and other drawings can be obtained by those of ordinary skill in the art from the provided drawings without creative efforts.

DETAILED DESCRIPTION

Electronic or electrical apparatuses and/or any other associated apparatuses or components (e.g., a display apparatus including a display panel and a display panel driver, wherein the display panel driver includes a drive controller, a gate driver, a gamma reference voltage generator, a data driver, and an emission driver) according to embodiments of concepts of the present application described herein can be implemented utilizing any suitable hardware, firmware (e.g., an application-specific integrated circuit), software, or a combination of software, firmware, and hardware. For example, the various components of these apparatuses can be formed on one IC chip or individual IC chips. Further, the various components of these apparatuses can be implemented on a flexible printed circuit film, a tape carrier package (TCP), or a printed circuit board (PCB), or formed on a substrate. In addition, the various components of these apparatuses can be a process or thread, running on one or more processors, in one or more computing apparatuses, executing computer program instructions and interacting with other system components to perform various functions described herein. The computer program instructions are stored in a memory. The memory can be implemented in a computing apparatus using a standard memory apparatus (e.g. a random access memory (RAM)). The computer program instructions can also be stored in other non-transitory computer-readable media (such as a CD-ROM and a flash drive). Also, those of ordinary skill in the art should recognize that the functions of various computing apparatuses can be combined or integrated into a single computing apparatus, or the functions of a particular computing apparatus can be distributed across one or more other computing apparatuses without departing from the spirit and scope of exemplary embodiments of the present application.

A touch display apparatus is a display apparatus with a touch function, such as a touch screen or a touch display. The touch display apparatus includes a touch display panel. The touch display panel includes a touch function layer and a display function layer. The touch function layer can be classified into two types: self-capacitance and mutual-capacitance.

Figure 1:
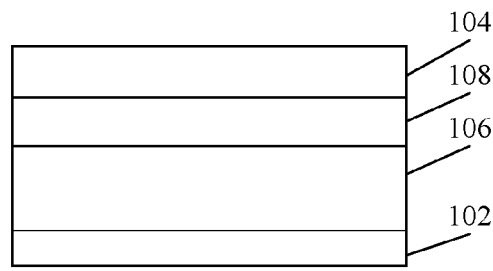
FIG. 1 is a schematic view of a partial structure of a self-capacitance touch display panel in the related art.
Figure 2:
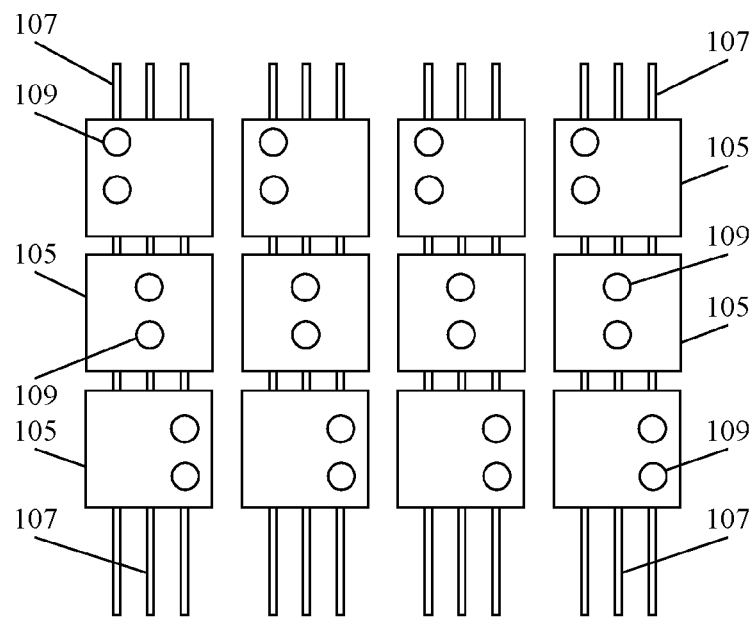
FIG. 2 is a top partial view of the self-capacitance touch display panel shown in FIG. 1.

FIG. 1 is a schematic view a partial structure of a self-capacitance touch display panel in the related art. As shown in FIG. 1, the self-capacitance touch display panel includes a display function layer 102 and a touch function layer. The touch function layer includes an electrode sublayer 104, a wiring sublayer 106, and an insulating sublayer 108 located between the electrode sublayer 104 and the wiring sublayer 106, which are layered on the display function layer 102. FIG. 2 is a top partial view of the self-capacitance touch display panel shown in FIG. 1. As shown in FIG. 2, the electrode sublayer 104 includes a plurality of touch electrodes 105 arranged in array in the same layer. The wiring sublayer 106 includes a plurality of electrode wires 107 arranged parallel to each other in the same layer. The plurality of electrode wires 107 are in one-to-one correspondence to the plurality of touch electrodes 105. Each electrode wire 107 is located below the corresponding touch electrode 105 and is electrically connected to the corresponding touch electrode 105 via a conductive pillar 109 extending through the insulating sublayer 108.

As the plurality of touch electrodes 105 and the plurality of electrode wires 107 are arranged in different layers, and an insulating material is required to be provided between the touch electrodes 105 and the electrode wires 107, the entire touch function layer have to be formed by successively providing three sublayers, the wiring sublayer 106, the insulating sublayer 108, and the electrode sublayer 104, on the display function layer. As a result, there are many procedures in the production process, the production efficiency is relatively low, and the production cost is relatively high.

If the touch electrodes 105 and the electrode wires 107 are arranged in the same layer, then it is required that each of the electrode wires 107 is located between two adjacent touch electrodes 105. As each of the touch electrodes 105 has one corresponding electrode wire 107, and the electrode wires 107 are spaced apart from each other, a distance between two adjacent touch electrodes 105 is relatively large, which may affect the detection effect of the touch electrodes 105 on the touch action, resulting in an area between two adjacent touch electrodes 105 where the touch action is undetectable. Therefore, in practical applications, a separate layer of electrode wires electrically connected to touch electrodes in another layer has to be provided in the self-capacitance touch display panel, resulting in higher production cost of the self-capacitance touch display panel.

In order to solve the above problem, embodiments of the present application provide a touch display panel and a touch display apparatus. The touch display panel includes a substrate, a Bottom Shelter Metal (BSM) layer (hereinafter referred to as a shielding layer), a touch function layer, and a plurality of electrode wires. The shielding layer is arranged on one side of the substrate, and the shielding layer includes a plurality of shielding units arranged in array. The touch function layer is arranged on a side of the shielding layer facing away from the substrate, and the touch function layer includes a plurality of touch electrodes arranged in array. The plurality of electrode wires are in one-to-one correspondence to and electrically connected to the plurality of touch electrodes. The plurality of electrode wires include at least one first-type electrode wire, and the first-type electrode wire includes a first lead wire arranged on a same layer as the touch function layer and a second lead wire electrically connected to the first lead wire and arranged on a same layer as the shielding layer. The second lead wire and the shielding units are spaced apart and insulated from each other. The electrode wires arranged in different layers with the touch electrodes are transferred to a same layer as the shielding layer. The electrode wires connected to the touch electrodes are arranged at gaps on two sides of the shielding units, which can prevent separate arrangement of a layer to arrange the electrode wires connected to the touch electrodes, and can also prevent laying of an insulating material between the electrode wires on this layer and the touch electrodes. The entire touch function layer only requires separate arrangement of a layer of touch electrodes on the display function layer, which greatly reduces procedures of a production process, effectively improves manufacturing efficiency, and reduces manufacturing costs, without affecting a shielding effect of the shielding units on the external carriers.

The touch display panel provided in the embodiments of the present application, such as an Organic Light-Emitting Diode (OLED) display panel, is applicable to electronic devices such as a mobile terminal, a tablet computer, a notebook computer, a wearable device, and an in-vehicle device.

To facilitate understanding, some terms are explained before the detailed description.

Shielding layer: According to driving manners, the OLEDs can be classified into an Active Matrix Organic Light-Emitting Diode (AMOLED) and a Passive Matrix Organic Light-Emitting Diode (PMOLED). In the AMOLED, OLED pixels are controlled by using a Thin Film Transistor (TFT) array. In order to shield external carriers which may affect the TFT array, a shielding layer can be disposed between the substrate and the display function layer. Specifically, the shielding layer includes shielding units in one-to-one correspondence to TFTs. Each shielding unit is located between the corresponding TFT and the substrate. The substrate is a support for depositing a semiconductor material, which can support the layer formed by depositing the semiconductor material.

Self-capacitance touch: Touch manners are classified into two types: self-capacitance and mutual-capacitance. For the mutual-capacitance, touch electrodes are arranged in two layers, touch electrodes in the same layer are parallel to each other, and touch electrodes in different layers are perpendicular to each other. The touch electrodes in one layer are sequentially loaded with current signal, and the touch electrodes in the other layer detect the change in the current signal. A position of the touch action can be determined according to a position of a touch electrode currently loaded with a current signal and a position of a touch electrode which has just detected the change. For the self-capacitance, touch electrodes are arranged in array in the same layer, and each touch electrode is loaded with a current signal. The position of the touch action can be determined according to a position of a touch electrode which has just detected the change.

Figure 3:
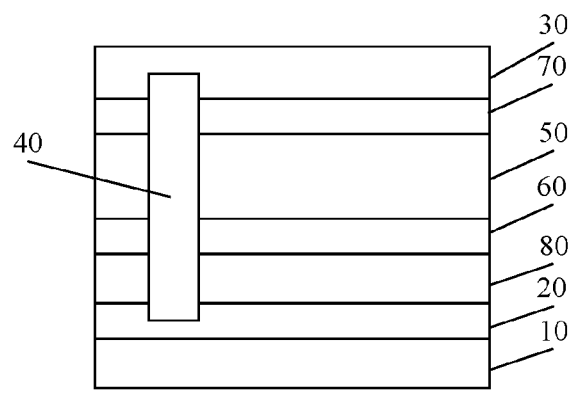
FIG. 3 is a schematic view of a partial structure of a touch display panel according to an embodiment of the present application.
Figure 4:
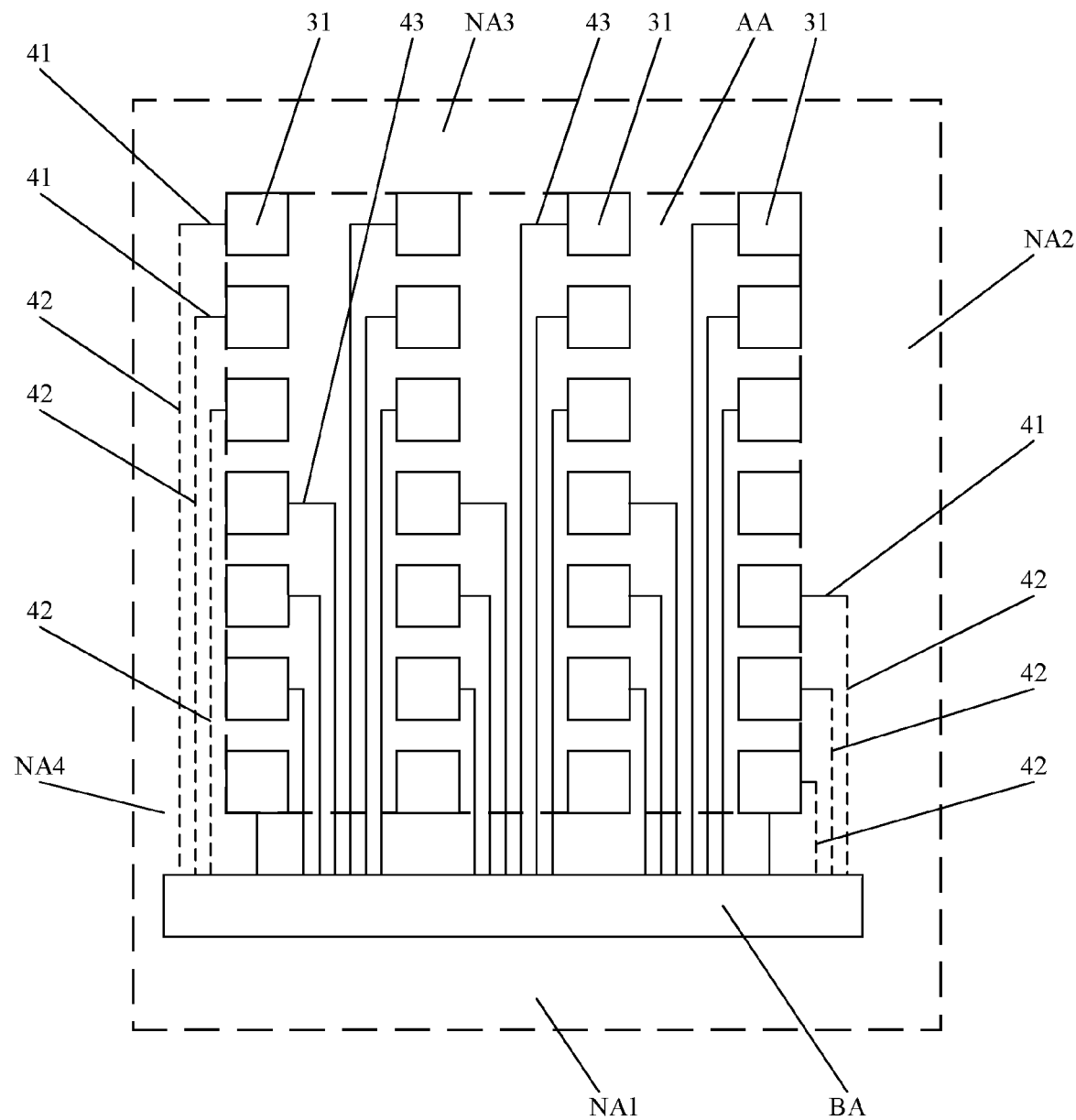
FIG. 4 is a top partial view of the touch display panel shown in FIG. 3.

FIG. 3 is a schematic view a partial structure of a touch display panel according to an embodiment of the present application. FIG. 4 is a top partial view of the touch display panel shown in FIG. 3. As shown in FIG. 3 and FIG. 4, the present application provides a touch display panel, including a substrate 10, a shielding layer 20, a touch function layer 30, and a plurality of electrode wires 40. The shielding layer 20 is disposed on a side of the substrate 10. The shielding layer 20 includes a plurality of shielding units arranged in array. The touch function layer 30 is disposed on a side of the shielding layer 20 facing away from the substrate 10. The touch function layer 30 includes a plurality of touch electrodes 31 arranged in array. The plurality of electrode wires 40 are in one-to-one correspondence to and electrically connected to the plurality of touch electrodes 31. The plurality of electrode wires 40 include at least one first-type electrode wire. The first-type electrode wire includes a first lead wire 41 disposed in the same layer as the touch function layer 30 and a second lead wire 42 electrically connected to the first lead wire 41 and disposed in the same layer as the shielding layer 20. The second lead wire 42 is spaced apart and insulated from and the shielding unit.

The above touch display panel includes the substrate, the shielding layer, the touch function layer, and the plurality of electrode wires. The shielding layer disposed on the side of the substrate includes the plurality of shielding units arranged in array, which can shield the display function layer of the touch display panel from the interference of external carriers. The touch function layer disposed on the side of the shielding layer facing away from the substrate includes the plurality of touch electrodes arranged in array, which can detect touch actions at different positions. The plurality of electrode wires are in one-to-one correspondence to and electrically connected to the plurality of touch electrodes. The plurality of electrode wires include at least one first-type electrode wire. The first-type electrode wire includes a first lead wire disposed in the same layer as the touch function layer and a second lead wire electrically connected to the first lead wire and disposed in the same layer as the shielding layer. The second lead wire is spaced apart and insulated from the shielding units. The touch electrodes can be connected to a touch IC via the corresponding electrode wires. By letting the electrode wires (e.g., the first-type electrode wires) disposed in a different layer from the touch electrodes be in the same layer as the shielding layer, and utilizing the spaces between the shielding units to dispose the electrode wires connecting to the touch electrodes, a separate layer for disposing the electrode wires connected to the touch electrodes is saved, and the insulating material disposed between the separate layer and the touch electrodes is also saved. Thus, the entire touch function layer only needs to contain one layer of touch electrodes disposed on the display function layer, which greatly reduces procedures of the production process, effectively improves the production efficiency, and reduces the production cost, without affecting the shielding effect of the shielding units on the external carriers.

Specifically, a material of the substrate 10 can be an inorganic material such as a glass material such as soda calcium, quartz, or sapphire, or a metal material such as stainless steel, aluminum, or nickel. The material of the substrate 10 can also be an organic material such as at least one selected from polymethyl methacrylate (PMMA), polyvinyl alcohol (PVA), polyvinyl phenol (PVP), polyether sulfone (PES), polyimide, polyamide, polyacetal, polycarbonate (PC), polyethylene terephthalate (PET), polyethylene naphthalate (PEN), or polyimide (PI).

For example, the shielding unit can be a metal sheet or a metal mesh, which can effectively shield the interference of external carriers.

For example, an orthographic projection of the touch electrode 31 on the substrate is one of a rectangle, a circle, and a rhombus, which can be specifically set according to requirements of the touch display panel, so as to realize detection on the touch action with the limited space of the touch display panel.

In an embodiment, the first lead wire 41 and the second lead wire 42 are electrically connected via a conductive pillar.

Specifically, the touch display panel has a display area AA and a non-display area NA at least partially surrounding the display area AA. The non-display area NA includes a bonding area BA located at a side of the display area AA. The display area AA is an area where the structure with the display function is located, which is generally a center area on a surface of the substrate 10. The non-display area NA is an area other than the display area AA, which is generally a peripheral area surrounding the display area AA. The bonding area BA is an area connected to the IC, which generally an area within the non-display area NA located at a side of the display area AA.

Correspondingly, the shielding layer 20 and the touch function layer 30 are sequentially stacked in the display area AA. In an embodiment, the first lead wire 41 is disposed in both the display area AA and the non-display area NA, and the second lead wire 42 is disposed only in the non-display area NA. By leading the electrode wire 40 (e.g., the first-type electrode wire) from the display area AA to the non-display area NA by the first lead wire 41, the second lead wire 42 in the same layer as the shielding layer 20 can extend in the non-display area NA to the bonding area BA, so as to avoid the shielding units in the display area AA to the greatest extent without affecting the functions of the shielding layer 20.

Correspondingly, the non-display area NA is provided with a contact hole extending in a direction perpendicular to the touch display panel, and the first lead wire and the second lead wire are electrically connected through the contact hole.

In an embodiment, as shown in FIG. 4, the electrode wire 40 corresponding to the touch electrode 31 proximal to the non-display area NA is the first-type electrode wire which includes the first lead wire 41 and the second lead wire 42. The first lead wire 41 is disposed in both the display area AA and a subarea of the non-display area NA closest to the corresponding touch electrode 31. As the electrode wire 40 corresponding to the touch electrode 31 proximal to the non-display area NA is also proximal to the non-display area NA, by having the first lead wire 41 disposed in both the display area AA and the subarea of the non-display area NA closest to the corresponding touch electrode 31, the electrode wire 40 can be conveniently led from the display area AA to the non-display area NA.

Specifically, as shown in FIG. 4, the non-display area NA includes a first subarea NA1, a second subarea NA2, a third subarea NA3, and a fourth subarea NA4 arranged surrounding the display area AA and sequentially connected to each other end to end. The first subarea NA1 is opposite to the third subarea NA3, and the second subarea NA2 is opposite to the fourth subarea NA4. The bonding area BA is located in the first subarea NA1.

Correspondingly, the first lead wire 41 of the electrode wire 40 corresponding to the touch electrode 31 proximal to the second subarea NA2 is disposed in both the display area AA and the second subarea NA2. The first lead wire 41 of the electrode wire 40 corresponding to the touch electrode 31 proximal to the third subarea NA3 is disposed in both the display area AA and the third subarea NA3. The first lead wire 41 of the electrode wire 40 corresponding to the touch electrode 31 proximal to the fourth subarea NA4 is disposed in both the display area AA and the fourth subarea NA4.

In an embodiment, the electrode wire 40 corresponding to the touch electrode 31 proximal to the center of the display area AA is the first-type electrode wire which includes the first lead wire 41 and the second lead wire 42. The first lead wire 41 is disposed in both the display area AA and a subarea of the non-display area NA where the bonding area BA is located. For example, in FIG. 4, the first lead wire 41 of the electrode wire 40 corresponding to the touch electrode 31 proximal to the center of the display area AA is disposed in both the display area AA and the first subarea NA1. As the electrode wire 40 corresponding to the touch electrode 31 proximal to the center of the display area AA is relatively far from the non-display area NA, by disposing the first lead wire 41 thereof in both the display area AA and the subarea of the non-display area NA where the bonding area BA is located, the electrode wire 40 can be conveniently electrically connected to the touch IC in the bonding area BA.

In another embodiment, the electrode wire 40 corresponding to the touch electrode 31 proximal to the center of the display area AA is a second-type electrode wire including a third lead wire 43 disposed in the same layer as the touch function layer 30. By having the electrode wire 40 corresponding to the touch electrode 31 disposed in the touch function layer 30, the design of wiring is easier.

In an embodiment, a first end of the first lead wire 41 extends to the corresponding touch electrode 31 in the display area AA. A first end of the second lead wire 42 extends to the bonding area BA in the non-display area NA. A second end of the first lead wire 41 and a second end of the second lead wire 42 are overlapped in the display area or the non-display area in a direction perpendicular to the touch display panel.

In an embodiment, the third lead wire 43 is disposed in both the display area AA and the non-display area NA. A first end of the third lead wire 43 extends to the corresponding touch electrode 31 in the display area AA, and a second end of the third lead wire 43 extends to the bonding area BA in the non-display area NA.

In practical applications, proportions of the first-type electrode wire and the second-type electrode wire in the electrode wires 40 corresponding to the touch electrodes 31 can be determined according to an interval between the touch electrodes 31. If the interval between the touch electrodes 31 is relatively large, the proportion of the second-type electrode wire is relatively large. If the interval between the touch electrodes 31 is relatively small, the proportion of the first-type electrode wire is relatively large.

In another embodiment, the first lead wire 41 is disposed only in the display area AA, and the second lead wire 42 is disposed in both the display area AA and the non-display area NA.

In an embodiment, as shown in FIG. 3, the touch display panel further includes an anode layer 60, a light-emitting layer group 50, and a cathode layer 70 stacked on a side of the shielding layer 20 facing away from the substrate 10. The light-emitting layer group 50 includes a plurality of light-emitting units arranged in the same layer and spaced apart from each other. The anode layer 60 includes a plurality of anodes in one-to-one correspondence to and electrically connected to the plurality of light-emitting units. The cathode layer 70 is electrically connected to the light-emitting units.

In practical applications, a current is injected into the light-emitting layer group 50 through the anode layer 60 and the cathode layer 70 to drive the light-emitting layer group 50 to emit lights to realize the display function.

In an embodiment, as shown in FIG. 3, the touch function layer 30 is located on a side of the cathode layer 70 facing away from the light-emitting layer group 50. That is, the plurality of touch electrodes 31 are disposed in a separate layer.

Specifically, the light-emitting layer group 50 includes an organic electroluminescent material layer and at least one of a hole injection layer, a hole transport layer, an electron barrier layer, a hole barrier layer, an electron transport layer, and an electron injection layer.

In an embodiment, the plurality of light-emitting units are arranged in rows in a first direction and in columns in a second direction perpendicular to the first direction.

Further, the touch display panel further includes a pixel definition layer. The pixel definition layer has a plurality of through-openings in one-to-one correspondence to the plurality of light-emitting units in the display area AA. Each through-opening exposes at least part of the corresponding anode layer.

Further, the touch display panel further includes a supporting pillar layer. The supporting pillar layer includes a plurality of supporting pillars in the display area AA. The supporting pillars are disposed on a side of the pixel definition layer away from the substrate 10.

In an embodiment, the touch display panel further includes a packaging layer. The packaging layer is arranged on a side of the cathode layer 70 away from the substrate 10. Specifically, the packaging layer can include an inorganic packaging layer and an organic packaging layer. The inorganic packaging layer can effectively prevent intrusion of external water and oxygen into the light-emitting layer group 50. The organic packaging layer can realize planarization and weaken stress between the inorganic packaging layers.

In practical applications, an edge of the packaging layer is located on a side of the non-display area NA proximal to the display area AA. When the touch function layer 30 is located on a side of the cathode layer 70 facing away from the light-emitting layer group 50, if the first lead wire 41 is disposed in both the display area AA and the non-display area NA, and the second lead wire 42 is disposed only in the non-display area NA, then the electrode wire 40 will not pass through the packaging layer, which is beneficial to prevent intrusion of the external water and oxygen into the light-emitting layer group 50.

In an embodiment, the touch display panel further includes a driving circuit layer 80. The driving circuit layer 80 is arranged between the anode layer 60 and the shielding layer 20.

Specifically, the driving circuit layer 80 includes a plurality of driving units in one-to-one correspondence to the plurality of light-emitting units. Each driving unit includes a transistor and a storage capacitor. For example, the transistor can be a TFT, such as a top-gate TFT, a bottom-gate TFT, or a double-gate TFT. A material of the TFT can be an amorphous silicon semiconductor material, a low-temperature polysilicon semiconductor material, a metal oxide semiconductor material, an organic semiconductor material, or other semiconductor materials.

Specifically, the transistor has a first terminal, a second terminal, and a control terminal. The control terminal is a gate of the transistor, one of the first terminal and the second terminal is a source of the transistor, and the other of the first terminal and the second terminal is a drain of the transistor.

Correspondingly, the driving circuit layer 80 can include a semiconductor layer, a gate insulating layer, a gate layer, an interlayer dielectric layer, and a source-drain metal layer stacked sequentially on the substrate 10 to form the top-gate TFT. The driving circuit layer 80 can alternatively include a gate layer, a gate insulating layer, a semiconductor layer, an interlayer dielectric layer, and a source-drain metal layer stacked sequentially to form the bottom-gate TFT. The driving circuit layer 80 can alternatively include a semiconductor layer, a first gate insulating layer, a first gate layer, a second gate insulating layer, a second gate layer, an interlayer dielectric layer, and a source-drain metal layer to form the double-gate TFT.

Further, the driving circuit layer 80 further includes a passivation layer. The passivation layer is disposed on a side of the source-drain metal layer away from the substrate to protect the source-drain metal layer.

Further, the driving circuit layer 80 further includes a buffer layer. The buffer layer is disposed between the semiconductor layer and the substrate 10. Both the semiconductor layer and the gate layer are located on a side of the buffer layer away from the substrate 10 to alleviate lattice mismatch between the driving circuit layer 80 and the substrate 10.

Further, the driving circuit layer 80 further includes a planarization layer. The planarization layer is disposed on a side of the source-drain metal layer away from the substrate to provide a planarized surface for disposing the light-emitting layer group 50, the anode layer 60, and the cathode layer 70.

Figure 5:
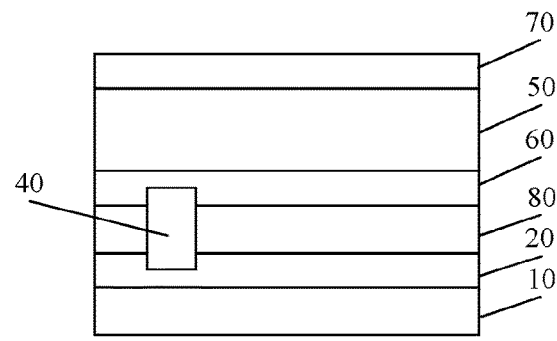
FIG. 5 is a schematic view of a partial structure of a touch display panel according to another embodiment of the present application.
Figure 6:
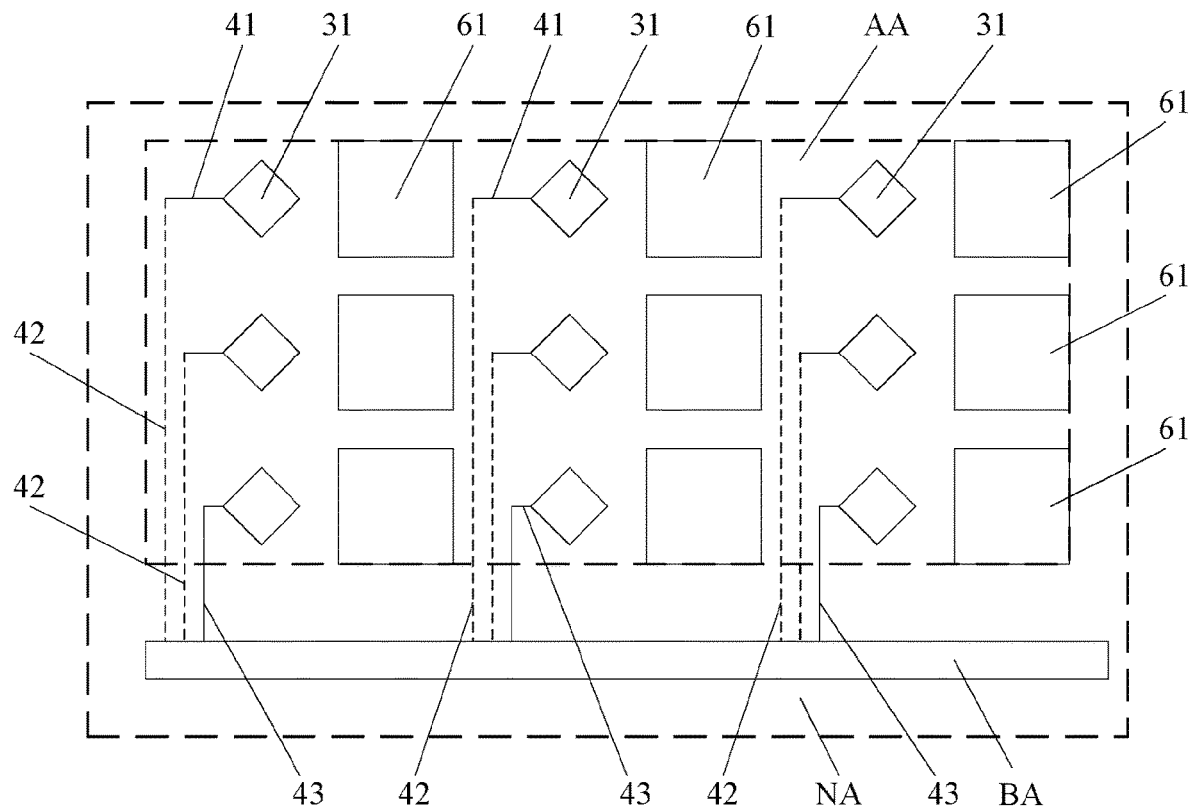
FIG. 6 is a top partial view of the touch display panel shown in FIG. 5.

FIG. 5 is a schematic view of a partial structure of a touch display panel according to another embodiment of the present application. FIG. 6 is a top partial view of the touch display panel shown in FIG. 5. As shown in FIG. 5 and FIG. 6, the touch electrodes 31 and the anodes 61 are arranged in the same layer and spaced apart from each other.

In this embodiment, the touch electrodes are further transferred into the same layer as the anode layer, and the touch electrodes are disposed in spaces between anodes in the anode layer, so that a separate layer for disposing the touch electrodes is not required, further reducing the procedures of the production process, improving the production efficiency, and reducing the production cost, without affecting injection of currents from the anodes to the light-emitting units.

In an embodiment, as shown in FIG. 6, each of the touch electrodes 31 is disposed between two adjacent anodes 61 in the first direction.

The touch electrodes 31 are arranged between the spaces between the anodes 61, so as to be in the same layer as the anodes 61 without affecting the anodes 61.

Further, as shown in FIG. 6, the plurality of touch electrodes 31 are spaced apart from each other in the second direction.

By spacing apart the plurality of touch electrodes 31 from each other in the second direction, the electrode wires 40 corresponding to the touch electrodes 31 can be conveniently arranged parallel to each other. In an embodiment, the display area AA is provided with a contact hole extending along a direction perpendicular to the touch display panel, and the first lead wire 41 and the second lead wire 42 are electrically connected through the contact hole.

Specifically, the first lead wire 41 is disposed only in the display area AA, and the second lead wire 42 is disposed in both the display area AA and the non-display area NA.

The shielding units and the anodes are all in the display area AA, and the electrode wires 40 are led from the anode layer 60 to the shielding layer 20 in the display area AA, so that the electrode wires 40 will not pass through a packaging layer, which is beneficial to prevent intrusion of external water and oxygen into the light-emitting layer group 50.

Further, as shown in FIG. 6, when the plurality of electrode wires 40 further include at least one second-type electrode wire, the second-type electrode wire includes a third lead wire 43 disposed in the same layer as the touch function layer.

As the electrode wire 40 corresponding to the touch electrode 31 is disposed in the touch function layer, the design of wiring is easier. In addition, a driving circuit layer 80 is generally disposed between the anode layer 60 and the shielding layer 20, so the distance between the electrode wire 40 in the same layer as the anode layer 60 and the electrode wire 40 in the same layer as the shielding layer 20 is relatively large, which is beneficial to reduce mutual interference between the electrode wires 40.

In practical applications, the electrode wire 40 proximal to the bonding area BA is the second-type electrode wire, and the electrode wire 40 far away from the bonding area BA is the first-type electrode wire.

In an embodiment, as shown in FIG. 6, the plurality of electrode wires 40 include a plurality of first-type electrode wires and a plurality of second-type electrode wires.

Figure 7:
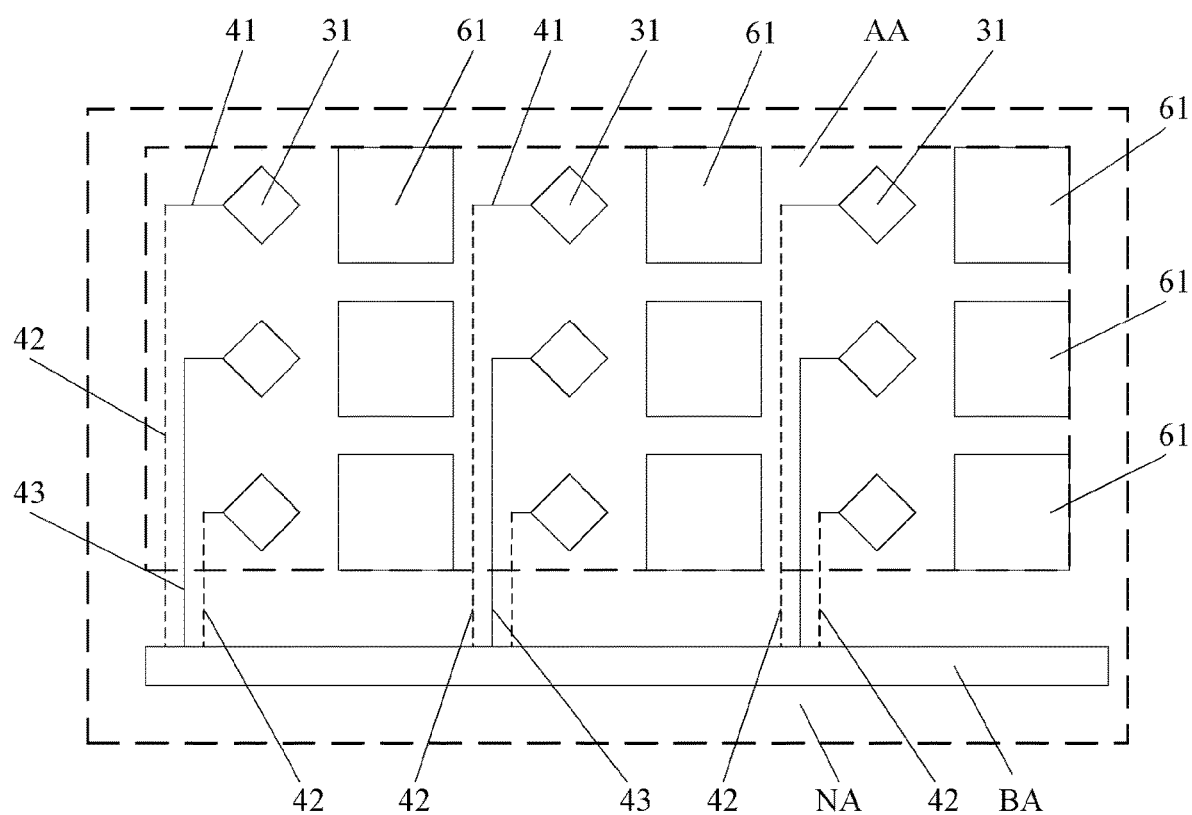
FIG. 7 is another top partial view of the touch display panel shown in FIG. 5.

FIG. 7 is another top partial view of the touch display panel shown in FIG. 5. As shown in FIG. 7, in one column of the touch electrodes 31, the touch electrodes 31 electrically connected to the first-type electrode wire and the touch electrodes 31 electrically connected to the second-type electrode wire are arranged alternately.

As the touch electrodes 31 electrically connected to the first-type electrode wires and the touch electrodes 31 electrically connected to the second-type electrode wires are arranged alternately in the column direction, the distance between the electrode wires 40 electrically connected to two adjacent touch electrodes 31 is relatively large, which is beneficial to reduce mutual interference between the electrode wires 40.

Figure 8:
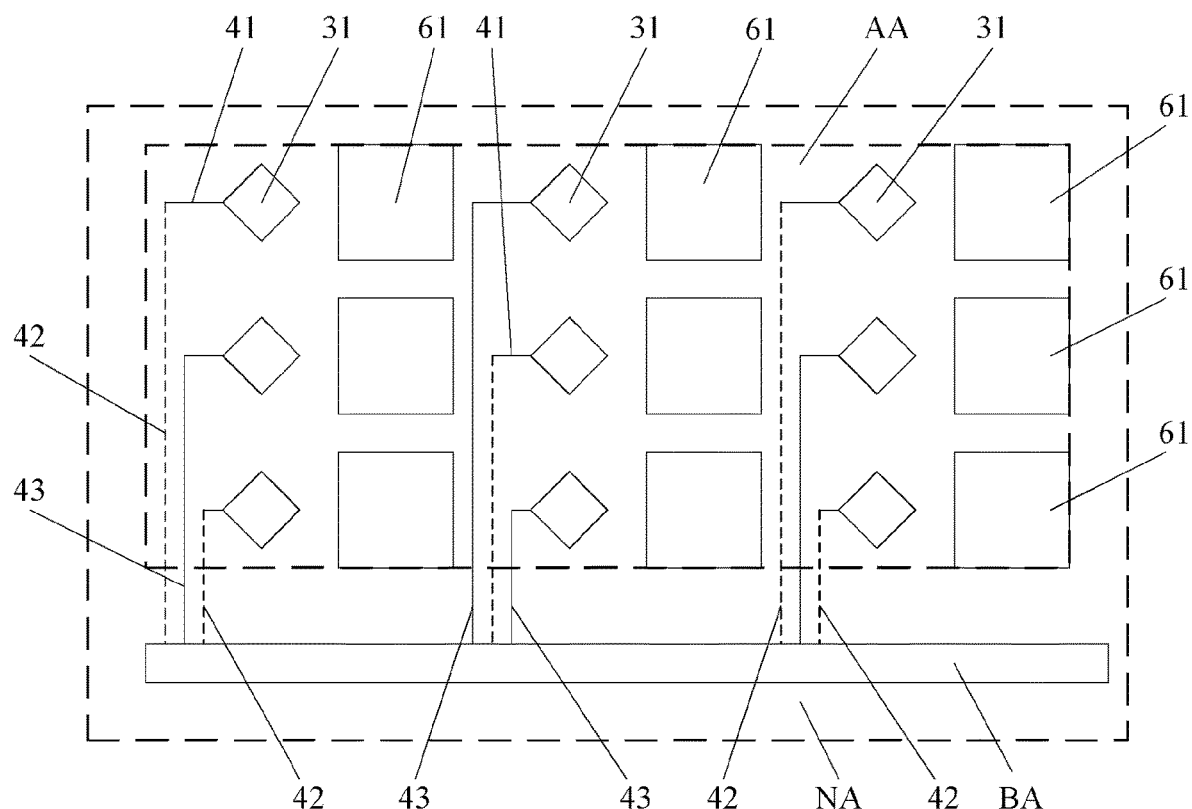
FIG. 8 is yet another top partial view of the touch display panel shown in FIG. 5.

FIG. 8 is yet another top partial view of the touch display panel shown in FIG. 5. As shown in FIG. 8, in two adjacent columns of the touch electrodes 31, the touch electrodes 31 electrically connected to the first-type electrode wires and the touch electrodes 31 electrically connected to the second-type electrode wires are arranged in a staggered manner.

As the touch electrodes 31 electrically connected to the first-type electrode wires and the touch electrodes 31 electrically connected to the second-type electrode wires are arranged in a staggered manner in both the column direction and the row direction, the distance between the electrode wires 40 electrically connected to two adjacent touch electrodes 31 can be largest, which can minimize the mutual interference between the electrode wires 40.

Figure 9:
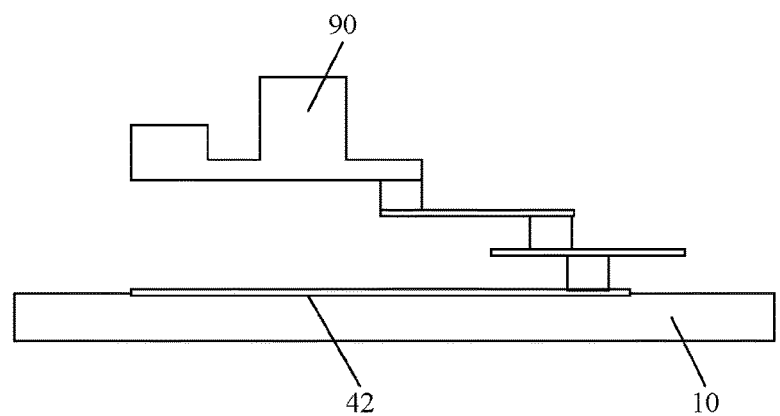
FIG. 9 is a schematic view of a partial structure between a display area and a non-display area of a touch display panel according to an embodiment of the present application.

FIG. 9 is a schematic diagram of a partial structure between the display area and the non-display area of the touch display panel according to an embodiment of the present application. As shown in FIG. 9, in an embodiment, the touch display panel further includes a bank structure 90 disposed on the substrate 10 and located in the non-display area NA. The second lead wire 42 passes through a side of the bank structure 90 proximal to the substrate 10.

In this embodiment, the second lead wire 42 is located underneath the bank structure and located between the bank structure 90 and the substrate 10.

In this embodiment, by disposing the bank structure 90 in the non-display area NA, cracks on an edge when the touch display panel is cut can be prevented, and extension of the cracks to the display area AA can be prevented. The second lead wire 42 is electrically connected to a chip in the bonding area by passing underneath the bank 90 without passing over the bank 90. If the electrode wire 40 passes over the bank structure 90, the height of the bank 90 would cause the photoresist for depositing the electrode wire 40 relatively thick, so that the photoresist is prone to insufficient exposure and residues, thereby leading to short circuiting between the electrode wires 40. If the full exposure of the photoresist is otherwise pursued, the production consumption and the production cost would be increased. In this embodiment, the electrode wires 40 pass underneath the bank structure 90, which can prevent the problem of short circuiting of the electrode wires 40 caused by photoresist residue or the problem of higher production cost due to overexposure in case of the electrode wires 40 passing over the bank.

In an embodiment, the plurality of electrode wires 40 are all first-type electrode wires.

When the plurality of electrode wires 40 are all first-type electrode wires, all the electrode wires 40 pass underneath the bank structure 90, which can prevent the problem of short circuiting of the electrode wires 40 caused by photoresist residue or the problem of higher production cost due to overexposure in case of the electrode wires 40 passing over the bank.

In practical applications, the non-display area NA may include a bending area located between the display area AA and the bonding area BA to bend the bonding area BA of the display panel to a back side of the display area AA to meet the edge display requirement for the touch display panel and improve the screen-to-body ratio. The electrode wire 40, after passing through the bank structure 90 from a side of the bank structure 90 proximal to the substrate 10, is first transferred from the shielding layer 20 to the wiring layer in the bending area through the conductive pillar, and then transferred back to the shielding layer 20 from the wiring layer in the bending area through the conductive pillar after passing through the bending area.

The electrode wire 40 is first transferred to the wiring layer before passing through the bending area, and then transferred back to the shielding layer 20 after passing through the bending area, so as to protect all wires in the bending area.

It is to be noted that the foregoing "above" and "below" are defined by a stacking direction of the touch display panel. The substrate 10 is located at the bottom of the touch display panel. In order of stacking, the layer first stacked is located below the layer stacked later.

Based on the same inventive concept, embodiments of the present application further provide a touch display apparatus. The display apparatus includes the touch display panel in the above embodiments.

It should be understood that the touch display apparatus in the embodiments of the present application can be any product or component having a display function, such as an OLED display apparatus, a QLED display apparatus, an electronic paper, a mobile phone, a tablet computer, a TV, a display, a notebook computer, a digital photo frame, a navigator, a wearable device, or an Internet of Things device, which is not limited in the embodiments of the present application.

The technical features in the above embodiments can be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present application, and their description is specific and detailed, but cannot therefore be understood as a limitation on the patent scope of the present application. It should be noted that those of ordinary skill in the art can further make variations and improvements without departing from the conception of the present application, and these all fall within the protection scope of the present application. Therefore, the patent protection scope of the present application should be subject to the appended claims.

What is claimed is:

1. A touch display panel, comprising:
   a substrate;
   a shielding layer disposed on a side of the substrate, the shielding layer comprising a plurality of shielding units arranged in array;
   a touch function layer disposed on a side of the shielding layer facing away from the substrate, the touch function layer comprising a plurality of touch electrodes arranged in array; and
   a plurality of electrode wires in one-to-one correspondence to and electrically connected to the plurality of touch electrodes;
   wherein the plurality of electrode wires comprise at least one first-type electrode wire comprising a first lead wire and a second lead wire electrically connected to the first lead wire, the first lead wire is in the same layer as the touch function layer, the second lead wire is in the same layer as the shielding layer, and the second lead wire is spaced apart and insulated from the shielding units.

2. The touch display panel according to claim 1, further comprising:
   an anode layer and a light-emitting layer group stacked on the side of the shielding layer facing away from the substrate,
   wherein the light-emitting layer group comprising a plurality of light-emitting units arranged in the same layer and spaced apart from each other, the plurality of light-emitting units are arranged in rows in a first direction and in columns in a second direction perpendicular to the first direction, and the anode layer comprising a plurality of anodes in one-to-one correspondence to and electrically connected to the plurality of light-emitting units.

3. The touch display panel according to claim 2, wherein the touch electrodes and the anodes are arranged in the same layer and spaced apart from each other.

4. The touch display panel according to claim 3, wherein each of the touch electrodes is disposed between two adjacent anodes in the first direction.

5. The touch display panel according to claim 2, wherein further comprising:
   a driving circuit layer arranged between the anode layer and the shielding layer.

6. The touch display panel according to claim 1, wherein the plurality of electrode wires further comprise at least one second-type electrode wire in the same layer as the touch function layer.

7. The touch display panel according to claim 6, wherein the second-type electrode wire comprises a third lead wire in the same layer as the touch function layer.

8. The touch display panel according to claim 6, wherein the plurality of electrode wires comprise a plurality of first-type electrode wires and a plurality of second-type electrode wires, and
   in one column of the touch electrodes, the touch electrodes electrically connected to the first-type electrode wires and the touch electrodes electrically connected to the second-type electrode wires are arranged alternately.

9. The touch display panel according to claim 8, wherein in two adjacent columns of the touch electrodes, the touch electrodes electrically connected to the first-type electrode wires and the touch electrodes electrically connected to the second-type electrode wires are arranged in a staggered manner.

10. The touch display panel according to claim 1, wherein the plurality of electrode wires are all first-type electrode wires.

11. The touch display panel according to claim 1, having a display area and a non-display area at least partially surrounding the display area;
wherein the display area is provided with a contact hole extending in a direction perpendicular to the touch display panel, the first lead wire and the second lead wire are electrically connected through the contact hole.

12. The touch display panel according to claim 11, wherein the first lead wire is disposed in both the display area and the non-display area, and the second lead wire is disposed only in the non-display area.

13. The touch display panel according to claim 11, wherein a first end of the first lead wire extends to corresponding touch electrode in the display area, a first end of the second lead wire extends to a bonding area in the non-display area, and a second end of the first lead wire and a second end of the second lead wire are overlapped with each other in the non-display area or the display area in a direction perpendicular to the touch display panel.

14. The touch display panel according to claim 11, wherein the electrode wire corresponding to the touch electrode proximal to the non-display area is the first-type electrode wire.

15. The touch display panel according to claim 14, wherein the plurality of electrode wires further comprise at least one second-type electrode wire comprising a third lead wire in the same layer as the touch function layer, and the electrode wire corresponding to the touch electrode proximal to a center of the display area is the second-type electrode wire.

16. The touch display panel according to claim 11, further comprising:
a bank structure arranged on the substrate and located in the non-display area;
wherein the second lead wire passes through a side of the bank structure proximal to the substrate.

17. The touch display panel according to claim 16, wherein the non-display area comprises a bending area, and the electrode wires, after passing through the side of the bank structure proximal to the substrate, are transferred from the shielding layer to a wiring layer in the bending area and then transferred back to the shielding layer.

18. A touch display apparatus, comprising the touch display panel according to claim 1.

* * * * *